US007811040B2

(12) United States Patent
Bailly et al.

(10) Patent No.: US 7,811,040 B2
(45) Date of Patent: Oct. 12, 2010

(54) SAFETY DEVICE APPLIED TO APPLIANCES FOR LIFTING BOARDS ONTO CEILINGS AND WALLS

(75) Inventors: Jean-Marc Bailly, Ambierle (FR); Denis Narelli, Saint Haon le Chatel (FR); Christophe Valette, Saint Bonnet de Cray (FR)

(73) Assignee: Roger Mondelin SAS, Ambierle (FR)

( * ) Notice: Subject to any disclaimer, the term of this patent is extended or adjusted under 35 U.S.C. 154(b) by 391 days.

(21) Appl. No.: 11/947,378

(22) Filed: Nov. 29, 2007

(65) Prior Publication Data

US 2008/0304936 A1 Dec. 11, 2008

(30) Foreign Application Priority Data

Dec. 1, 2006 (FR) .................................. 06 55264

(51) Int. Cl.
*E04G 21/14* (2006.01)
*B60P 1/14* (2006.01)
*B66D 1/50* (2006.01)

(52) U.S. Cl. ......................... 414/11; 254/4 C; 254/272; 187/264

(58) Field of Classification Search ................. 187/264; 254/266, 272–273, 277, 280, 390–392, 4 B, 254/4 C, 4 R; 414/10–12; 52/121
See application file for complete search history.

(56) References Cited

U.S. PATENT DOCUMENTS 3,033,529 A * 5/1962 Pierrat ........................ 74/89.2
3,487,952 A * 1/1970 Maher et al. .................. 414/11
5,557,892 A * 9/1996 Lavin .......................... 52/121
2005/0133768 A1* 6/2005 Huang ........................ 254/4 C

FOREIGN PATENT DOCUMENTS

EP 0 969 165 A1 1/2000
FR 2 758 150 A1 7/1998

OTHER PUBLICATIONS

French search report for FR0655264, dated Aug. 1, 2007.

* cited by examiner

*Primary Examiner*—Gregory W Adams
(74) *Attorney, Agent, or Firm*—Heslin Rothenberg Farley & Mesiti P.C.

(57) ABSTRACT

A safety device applied to appliances for lifting boards onto ceilings and walls comprises a telescopic mast, an upper part of which accommodates the board holder and traction and safety ropes operated by a manually controlled winch, a component for attaching and fastening the traction rope and safety rope so that they are at the same fastening level, and a mechanism for tensioning the safety rope. The attachment component is fixed in the lower receiving part of the terminal inner section of the telescopic assembly. The tensioning mechanism is external relative to the telescopic mast and situated facing the winch for winding the traction and safety ropes.

6 Claims, 6 Drawing Sheets

SAFETY DEVICE APPLIED TO APPLIANCES FOR LIFTING BOARDS ONTO CEILINGS AND WALLS

CROSS REFERENCE TO RELATED APPLICATIONS

This application claims priority from French patent application No. 0655264, filed on Dec. 1, 2006, the entire disclosure of which is incorporated herein by reference.

BACKGROUND ART

The invention relates to the technical field of lifting and handling appliances for boards made of wooden, composite, plaster or other materials designed to be placed on the ceilings and/or walls of a structure.

The Applicant has developed many appliances of this type which are marketed under the brand name LEVPANO and which are the subject of numerous patents.

These boards are large and are heavy loads to move and position; appliances of this type use telescopic masts which are raised manually by a winch. A broken-rope safety device is provided, this ensures that, if the traction rope used to raise or lower the sections that make up the mast fails, an additional safety rope takes over and acts as a substitute for the failed traction rope. A safety device of this type is described in French Patent No. 2538437 and has subsequently been improved by the device described in the Applicant's French Patent No. 2758150. The Applicant has used this patent to its satisfaction. FIG. 1 of the application shows the known safety device according to the prior art disclosed by French Patent No. 2758150. It employs a special arrangement of two ropes, a traction rope and a substitute safety rope, both these ropes being looped and separately attached by one of their ends to two shafts attached to the lower end of the terminal section of the mast having different positioning levels. The safety rope is therefore longer than the traction rope and is fitted in a manner that leaves slack between its lowest point and the retention shaft so that it is not used during normal operation. This safety rope is tensioned by a spring, one end of which is attached to the rope loop and the other end of which is attached to the inner section by means of a hole which allows fastening.

Although this device is widely used by the Applicant, it is not always practical to install it. The device is fitted inside the terminal section of the telescopic mast, as shown in FIG. 2 of above-mentioned French Patent No. 2758150.

The Applicant's approach was therefore to attempt to improve this safety device and the way it is fitted without compromising the necessary reliability and operating requirements.

The objective was therefore to externalise tensioning of the safety rope relative to the terminal section of the telescopic mast in order to make fitting the entire device easier.

The solution devised by the Applicant achieves this objective by completely rethinking the way in which the traction and safety ropes are attached compared with the previous practice described in the above-mentioned French patent.

This solution significantly improves the way in which the device is fitted by simplifying it and makes it possible, if applicable, for the maintenance operative to perform safety checks at any time without any particular difficulty by allowing immediate access to the device without the need to disassemble the telescopic mast assembly of the lifting appliance.

Thus, the safety device according to the invention meets the sought-after objective in terms of fitting, maintenance and cost, which are all drastically improved compared with the prior art.

BRIEF SUMMARY OF INVENTION

According to a first aspect of the invention, the safety device applied to appliances for lifting boards of the type comprising a telescopic mast, the upper part of which accommodates the board holder and traction and safety ropes operated by a manually controlled winch, is distinctive in that it comprises firstly a component for attaching and fastening the traction and safety ropes so that they are at the same fastening level, said attachment component being fixed in the lower receiving part of the terminal inner section of the telescopic assembly and secondly a mechanism for tensioning the safety rope, this mechanism being external relative to the telescopic mast and situated facing the winch for winding the traction and safety ropes.

According to another aspect, the safety device is distinctive in that the tensioning mechanism comprises a long connecting rod which is freely articulatedly mounted on the shaft by a positioning hole and its other end is designed to receive, in opposition, another deflecting pulley of the safety rope and in that a kickover spring is mounted on the shaft and one end rests against the opposite-facing part of the inner section and the other end is engaged in a hook shape formed on the outer face of the connecting rod.

These aspects and others will become apparent from the following description.

BRIEF DESCRIPTION OF THE DRAWING FIGURES

The object of the present invention is described, merely by way of example, in the accompanying drawings in which.

The object of the present invention is described, merely by way of example, in the accompanying drawings.

DETAILED DESCRIPTION

The safety device according to the invention is applied to appliances for lifting boards designed to be placed on the ceilings and/or walls of a structure regardless of the other features of these appliances, for example mechanisms for orienting the board-holder support.

The following description is given exclusively and directly in respect of the invention. The configuration of the telescopic elements which constitute the mast of the lifting appliance is immaterial and the illustration shown in FIG. 2 of the particular profiles of the telescopic sections is merely an example; the crucial feature of the configuration of the terminal inner section being that it is designed to use the mechanism for fastening the traction and safety ropes in accordance with the implementation described for the invention.

Figure 1:
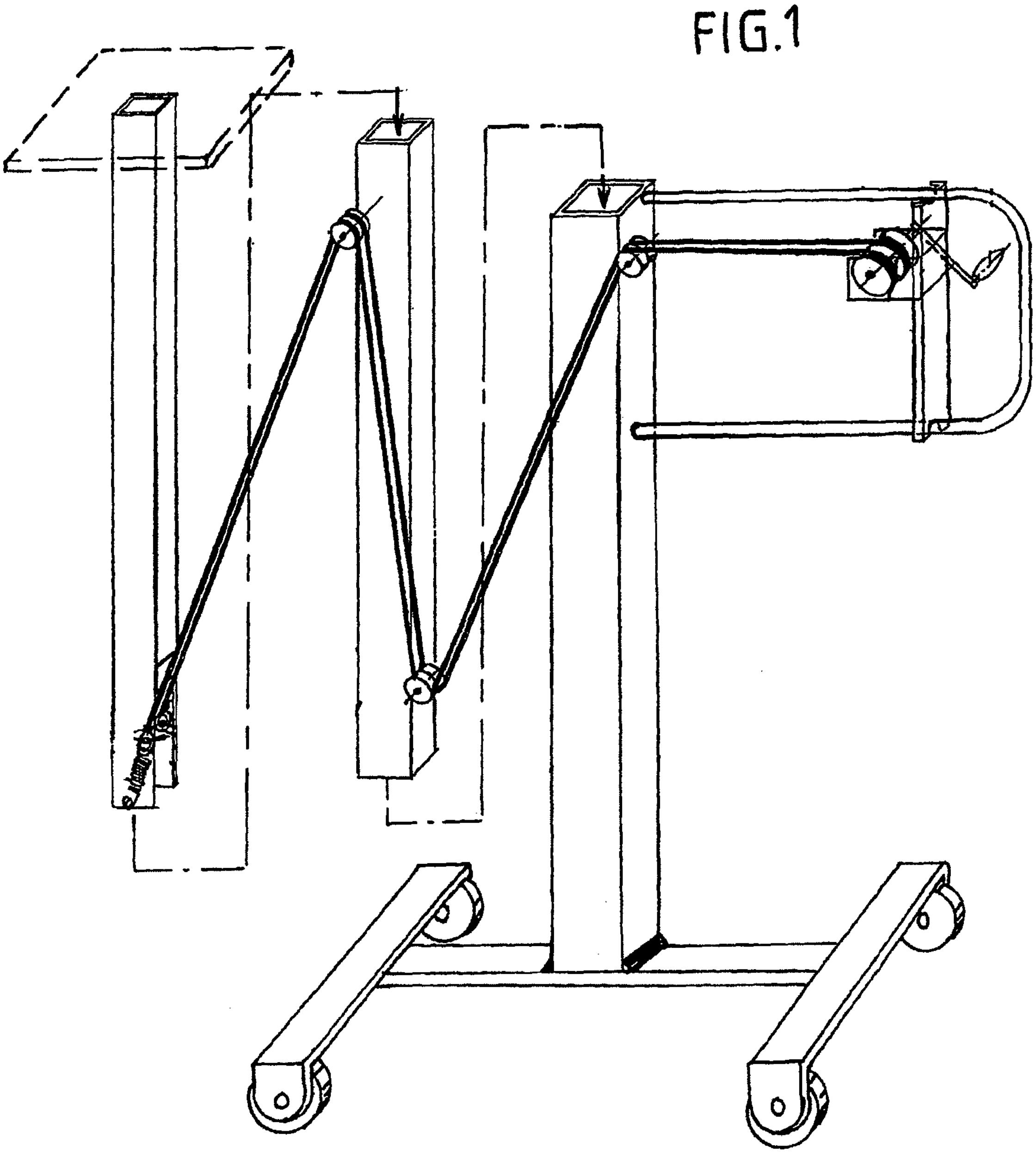
FIG. 1 is a perspective view of the safety device for the lifting appliance described in the Applicant's French patent No. 2758150 showing, in particular, the way the traction and safety ropes are fitted.
Figure 2:
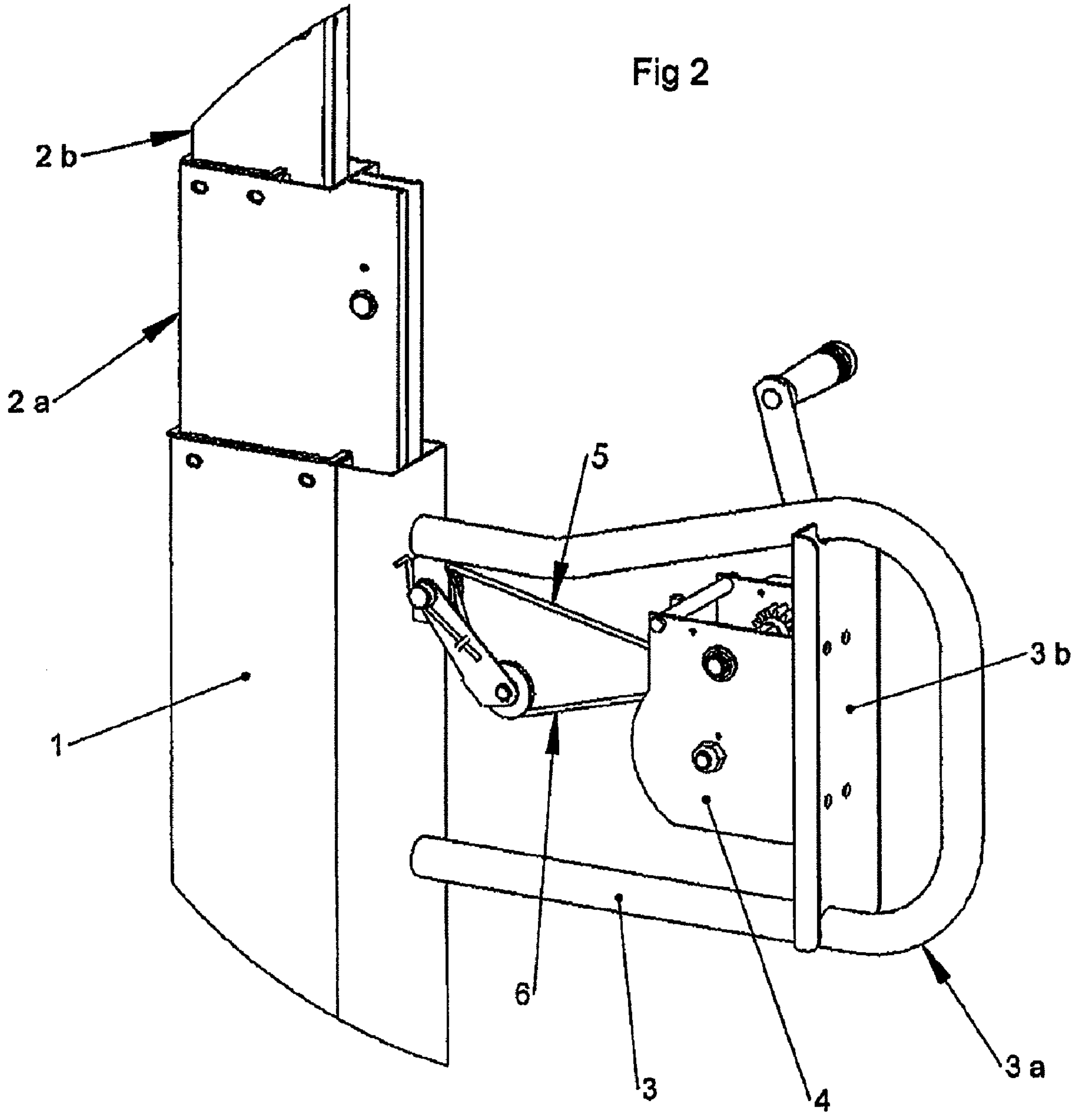
FIG. 2 is a partial perspective view of the safety device according to the invention and its external arrangement relative to the telescopic mast of the lifting appliance.

In FIG. 2, the appliance for lifting and handling boards comprises a fixed vertical section (1) forming an internally hollow shaped protective housing which allows movement and sliding of the other telescopic sections (2*a*) (2*b*) which constitute the mast, the terminal inner section (2*b*) which moves to the highest position being designed to be joined to the means of supporting and presenting the boards that are to be fitted. The matching sections (2*a*) (2*b*) are sections made of aluminium or other materials.

Fixed section (1) is designed so that one of its sides can accommodate a vertically arranged shaped support part (3) which has a dual function, namely to provide a means of gripping (3*a*) and moving the appliance and also to accommodate, on a support surface (3*b*), winch (4) on which the traction cable (5) and safety cable (6) are wound. This support part (3) is made of tubular sections for example.

The safety device according to the invention is described below, making reference to the drawings. The safety device comprises, in a special, original manner, firstly a component for attaching and fastening (7) the traction rope (5) and safety rope (6) so that they are at the same fastening level, said attachment component being fixed in the lower receiving part (2*b*1) of the terminal inner section (2*b*) of the telescopic assembly and secondly a mechanism (9) for tensioning the safety rope (6), this mechanism (9) being arranged externally relative to the telescopic mast and located facing the winch (4) for winding the traction and safety ropes. The mechanism (9) for tensioning the safety rope (6) is located inside support part (3).

Figure 3:
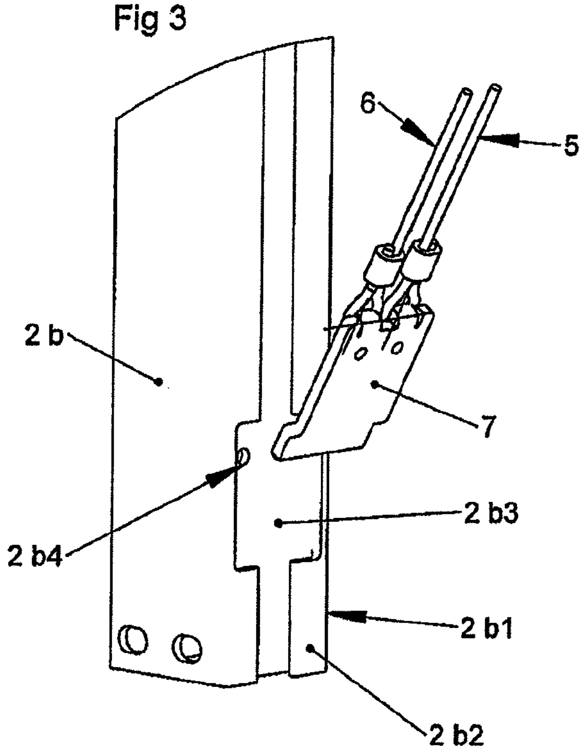
FIG. 3 is a partial view showing the means of attaching the traction and safety ropes before positioning on the terminal inner section of the mast and thus the special layout of the part which receives the section for the above-mentioned means.
Figure 4:
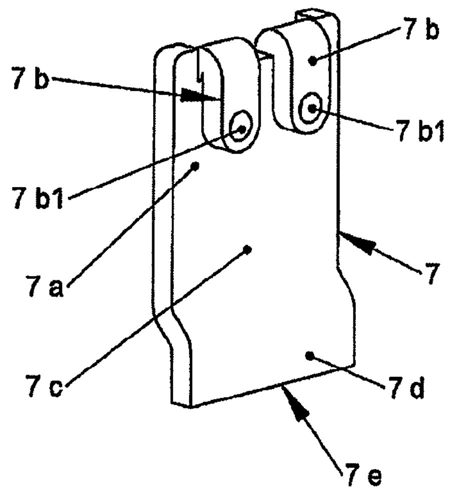
FIG. 4 is a three-quarter rear perspective view of the component for attaching the traction and safety ropes at the bottom of the terminal inner section.
Figure 5:
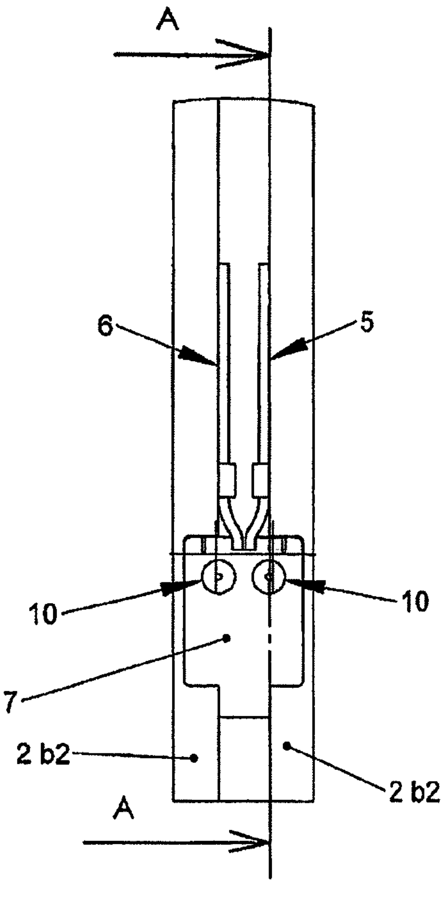
FIG. 5 is a view which supplements FIGS. 3 and 4 and shows how the component for attaching the traction and safety ropes is fitted and anchored on the terminal inner section.
Figure 6:
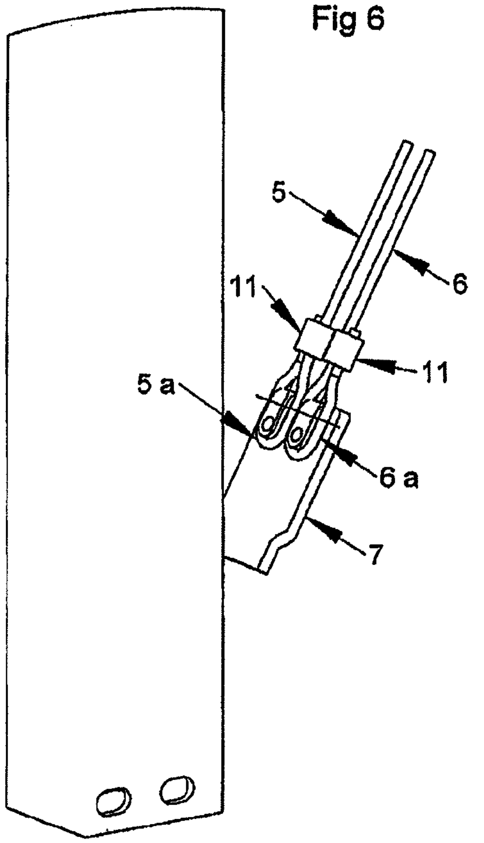
FIG. 6 is a partial perspective view related to FIG. 3 oriented in a different direction showing how the traction and safety ropes are fastened.
Figure 8:
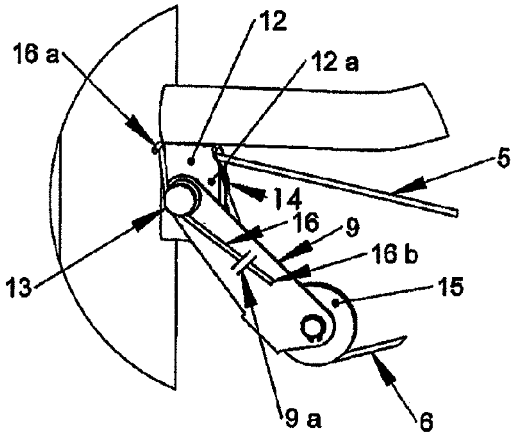
FIG. 8 shows the mechanism for tensioning the safety rope.
Figure 7:
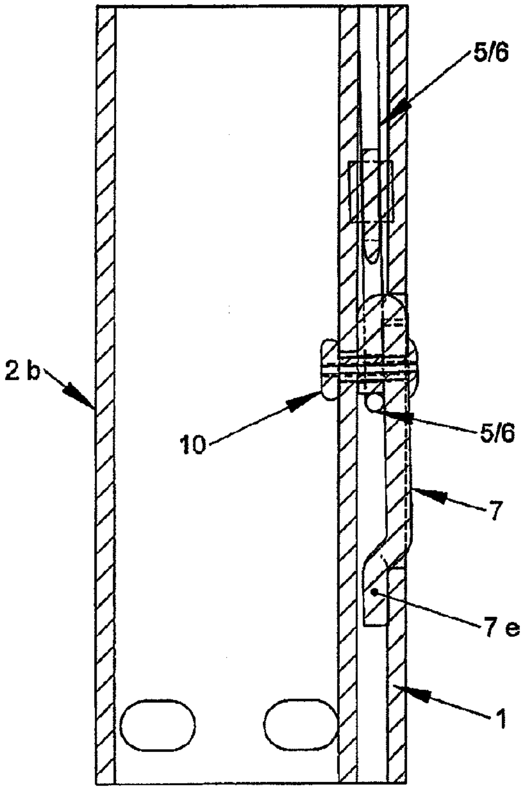
FIG. 7 is a partial longitudinal cross-sectional view along line A-A showing locking of the component for fastening the traction and safety ropes on the terminal inner section.

More especially, attachment component (7) is in the form of a shaped plate, the upper part (7*a*) of which has, on its inner face, two clamping points (7*b*) spaced apart and standing proud from the flat base (7*c*) of the plate. These two clamping points (7*b*) are parallel to each other with a gap between them and their lower part has a hole (7*b*1) through which a means of connection can pass. Each clamping point allows room for and fastening of the anchoring loops (5*a*) (6*a*) provided at the end of the traction and safety ropes, as shown in FIG. 6. Loops (5*a*) (6*a*) wrap around the above-mentioned clamping points and are therefore tensioned by the ropes which lead towards winch (4). The lower part (7*d*) of attachment plate (7) has an inwardly offset part (7*e*) so that it is anchored in the space provided for this purpose on the lower part of the terminal inner section of the telescopic mast. To achieve this and as shown in FIG. 3, terminal inner section (2*b*) has wings (2*b*2) on one side which face inwards and a cut-out (2*b*3) forming a window through which attachment part (7) can pass and be positioned. The bottom wall of the terminal inner section has two openings (2*b*4) which make it possible to engage means (10) for fastening and connecting the attachment part to the section as shown in FIG. 7. Means (10) can be rivets or other means and their only function is to secure part (7) on section (2*b*).

Ropes (5) and (6) have, close to their end loop part (5*a*) and (6*a*), completely conventional connecting rings (11). The rope strands therefore rise vertically along the wall of the above-mentioned inner section far enough to allow, using the simple pulley principle and lifting of the telescopic sections in the mast as described, for instance, in French Patent No. 2758150, deflection in order to extend the mast in the direction of above-mentioned winch (4).

Figure 9:
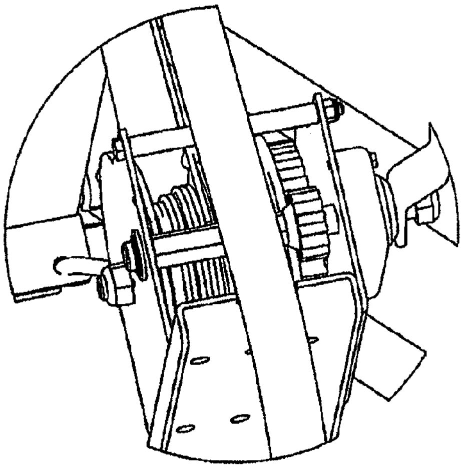
FIG. 9 shows a partial top view of the winch which accommodates the traction and safety ropes with a winding drum.

Thus, the fixed section has, at the location of support part (3), an opening around which there is provided an externally protruding fixed U-shaped yoke joint (12) separately mounted in any appropriate manner on the support face of the section. This yoke joint has two vertical, parallel wings (12*a*) between which two deflecting pulleys (14) of the traction rope and safety rope respectively are mounted on a shaft (13). Shaft (13) protrudes beyond the yoke joint and makes it possible to fasten the mechanism (9) for tensioning the safety rope. In practice, this tensioning mechanism (9) comprises a long connecting rod (9*a*) which is freely articulatedly mounted on shaft (13) via a positioning hole and its other end is designed to receive, in opposition, another deflecting pulley (15) of the safety rope. A kickover spring (16) is mounted on shaft (13), one end (16*a*) presses against the opposite-facing part of the inner section and the other end (16*b*) is engaged in a hook shape (9*a*) formed on the outer face of the connecting rod. As shown in FIGS. 2 and 9, traction rope (5), as it emerges from section (2*b*), is directed to the winch via the corresponding deflecting pulley (14). As it emerges from section (2*b*), safety rope (6) is guided towards tensioning mechanism (9) and rests on pulley (15) which is wound and then unwound on the drum of the winch. Obviously, a protective housing which is not shown fits on part (3) to protect the tensioning mechanism, winch and cable outlet.

Figure 10:
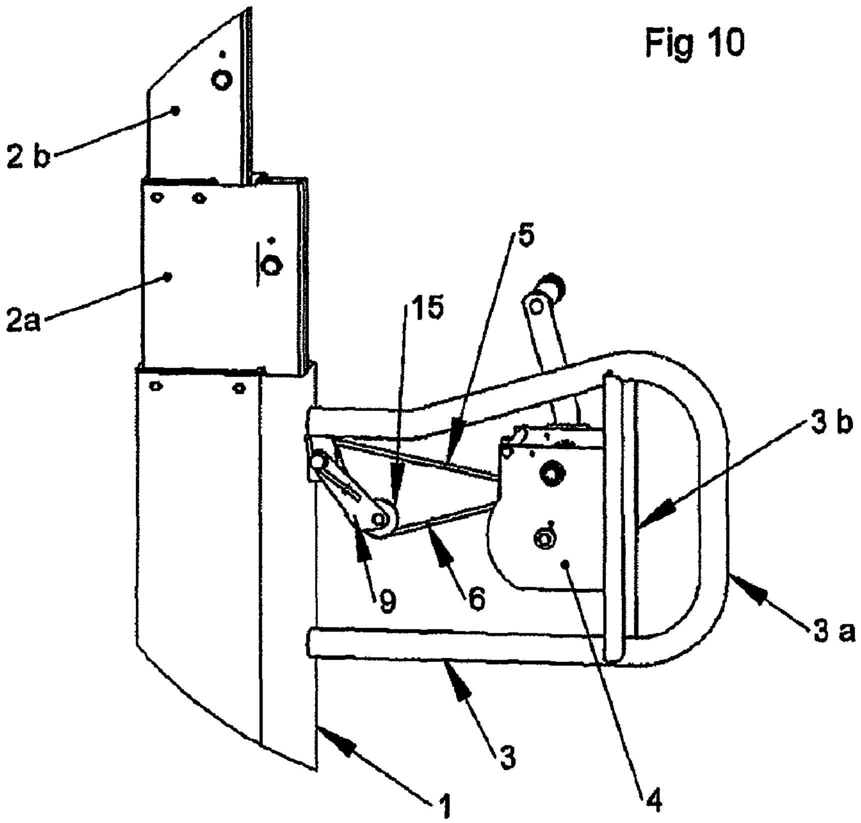
FIG. 10 is a side view showing the position of the mechanism for tensioning the safety rope when it is not actuated.

The connecting rod keeps the safety rope tensioned by means of spring (16) and, as long as the traction rope has not failed, the mechanism for tensioning the safety rope is not actuated. This is the situation shown in FIG. 10.

Figure 11:
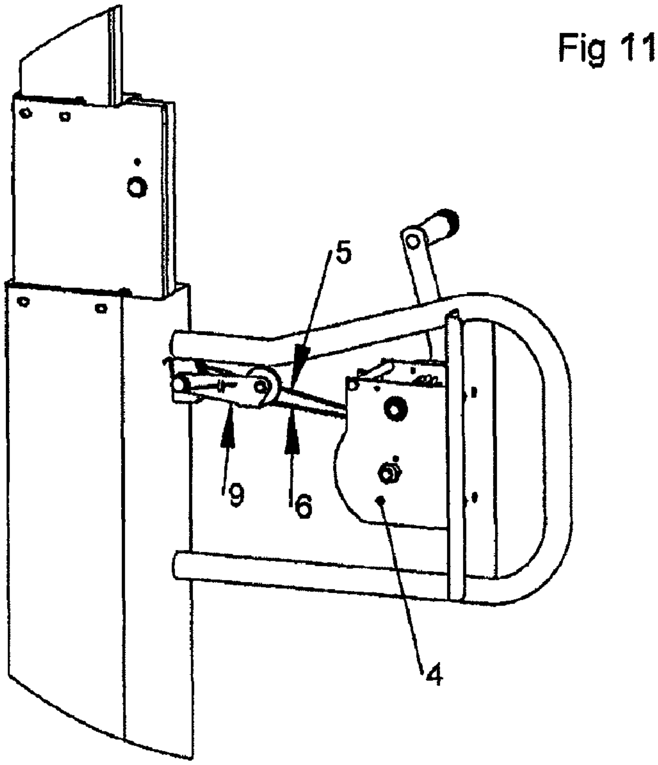
FIG. 11 is a side view as in FIG. 10, but when the mechanism for tensioning the safety rope is actuated.
Figure 12:
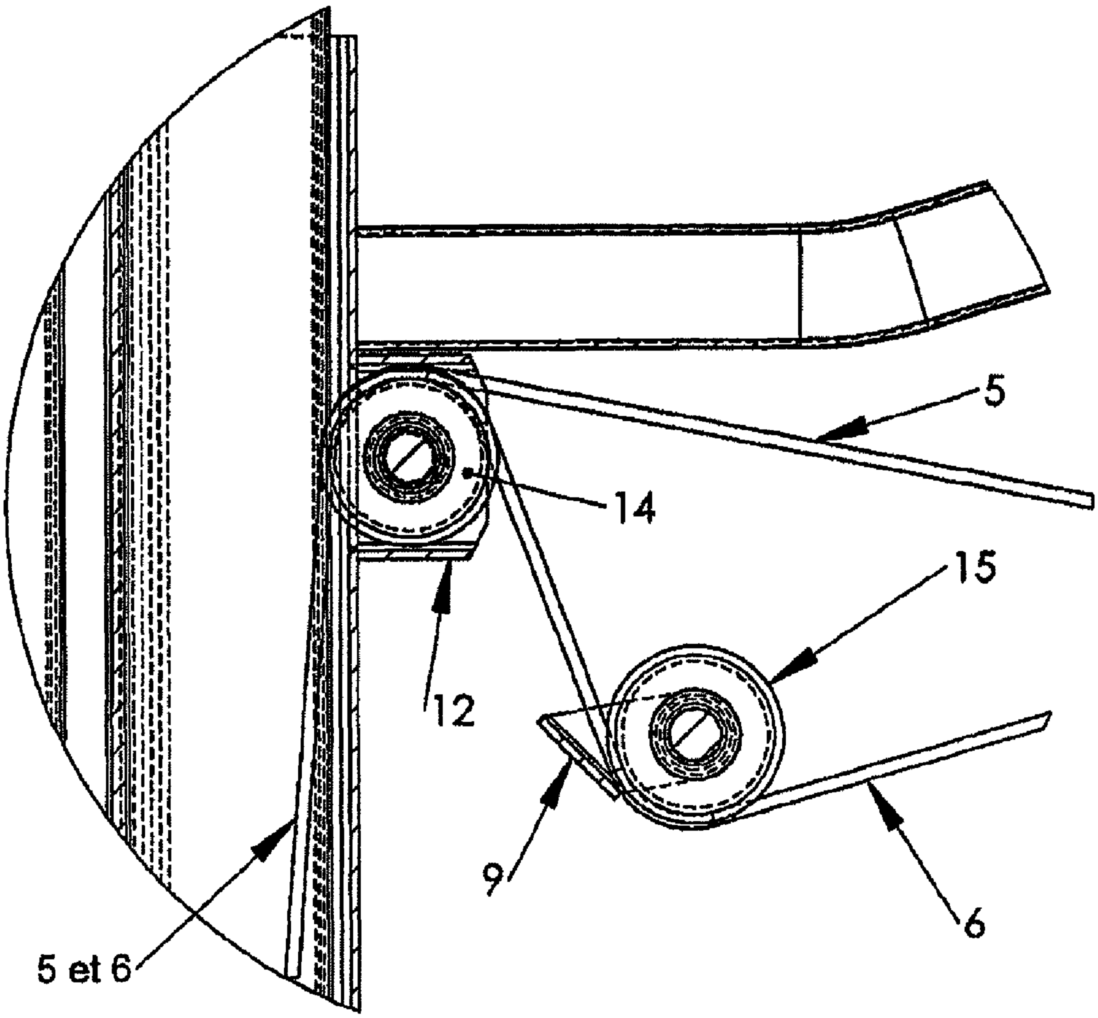
FIG. 12 is a partial longitudinal cross-sectional view showing how the ropes pass through the fixed section.

If traction rope (5) fails, the load is transferred to the safety rope which is tensioned. The connecting rod changes position due to the force exerted by the load acting on the safety rope, this force exceeds the force exerted by the spring, as shown in FIG. 11. The amplitude of the movement of the connecting rod around its shaft (13) makes it possible to give the safety rope more slack compared with the previous practice described in French Patent No. 2758150 and this ensures greater safety if traction rope fails.

The design of the safety device according to the invention of is simple and allows straightforward assembly of the components as well as fast, improved maintenance of the appliance. The components are easy to manufacture and inexpensive.

The solution therefore offers improved safety due to the optimised amplitude of the swiveling of the connecting rod and the effect thereof on the safety rope.

The invention claimed is:

1. A safety device for an appliance for lifting boards onto ceilings and walls, the appliance including a telescopic mast having an upper part accommodating a board holder, and a fraction rope and a safety rope operated by a manually controlled winch, the safety device comprising: an attachment component for attaching and fastening the traction rope and the safety rope so that the traction rope and the safety rope are at a same fastening level, said attachment component being fixed in a lower receiving part of a terminal inner section of the telescopic mast, a mechanism for tensioning the safety rope, said mechanism being external relative to the telescopic mast and situated facing the winch, and a vertically arranged shaped support part for attachment to a fixed section of the telescopic mast, the support part facilitating gripping and moving the appliance and accommodating, on a support surface of the support part, the winch on which the traction rope and the safety rope are wound, and wherein the mechanism for tensioning the safety rope is located in the support part, the fixed section has, at a location of the support part, an opening around which there is provided an externally protruding fixed V-shaped yoke joint separately mounted on a support face of the section, the yoke joint has two vertical, parallel wings, two deflecting pulleys of the traction rope and the safety rope respectively are mounted on a shaft between the wings, the shaft protrudes beyond the yoke joint and mounts the mechanism for tensioning the safety rope, the mechanism for tensioning comprises a connecting rod freely articulatedly mounted on the shaft via a positioning hole, and an other end of the mechanism receives, in opposition, another deflecting pulley of the safety rope.

2. A device as claimed in claim 1, wherein the attachment component comprises a shaped plate, an upper part of said plate having, on an inner face, two clamping points spaced apart from a flat base of the plate, the two clamping points being parallel to each other with a gap between the points and having a hole in a lower part for receiving a means for fastening, each clamping point allowing room for and fastening of a respective anchoring loop provided at an end of the traction rope and the safety rope, the respective loops wrap around respective clamping points and are tensioned by the traction rope and the safety rope which lead towards the winch, and a lower part of the attachment plate has an inwardly offset part to anchor the plate in a space on the lower receiving part of the terminal inner section of the telescopic mast.

3. A device as claimed in claim 2, wherein the terminal inner section has wings on one side which face inwards and a cut-out forming a window for receiving the attachment part, a wall of the terminal inner section has two openings to engage the means for fastening and connect the attachment part to the section.

4. A device as claimed in claim 1, wherein the tensioning mechanism further comprises a kickover spring mounted on the shaft with one end of the spring resting against an opposite-facing part of the terminal inner section and an other end of the spring engaged in a hook shape formed on an outer face of the connecting rod.

5. A device as claimed in claim 4, wherein the traction rope, as the traction rope emerges from the terminal inner section, is directed to the winch via the corresponding deflecting pulley, and wherein the safety rope, as the safety rope emerges from the terminal inner section, is guided towards the tensioning mechanism and rests on the another deflecting pulley and is wound and then unwound on a drum of the winch.

6. A device as claimed in claim 4, further comprising a protective housing which encloses the tensioning mechanism, the winch and the opening.

* * * * *

UNITED STATES PATENT AND TRADEMARK OFFICE

CERTIFICATE OF CORRECTION

PATENT NO. : 7,811,040 B2
APPLICATION NO. : 11/947378
DATED : October 12, 2010
INVENTOR(S) : Bailly et al.

It is certified that error appears in the above-identified patent and that said Letters Patent is hereby corrected as shown below:

Claim 1, at Column 5, Line 1: Delete "fraction" and insert --traction--

Signed and Sealed this
Eleventh Day of January, 2011

David J. Kappos
*Director of the United States Patent and Trademark Office*